(12) United States Patent
Yasuzawa et al.

(10) Patent No.: US 8,277,929 B2
(45) Date of Patent: Oct. 2, 2012

(54) METHOD FOR MODIFYING SURFACE OF SUBSTRATE, SUBSTRATE HAVING MODIFIED SURFACE, AND METHOD FOR PRODUCING SAME

(75) Inventors: Mikito Yasuzawa, Tokushima (JP); Takashi Koide, Tokushima (JP)

(73) Assignee: The University of Tokushima, Tokushima (JP)

( * ) Notice: Subject to any disclaimer, the term of this patent is extended or adjusted under 35 U.S.C. 154(b) by 1039 days.

(21) Appl. No.: 11/722,054

(22) PCT Filed: Dec. 16, 2005

(86) PCT No.: PCT/JP2005/023177
§ 371 (c)(1), (2), (4) Date: Jun. 18, 2007

(87) PCT Pub. No.: WO2006/064918
PCT Pub. Date: Jun. 22, 2006

(65) Prior Publication Data
US 2008/0138611 A1    Jun. 12, 2008

(30) Foreign Application Priority Data
Dec. 17, 2004   (JP) ................................. 2004-365903

(51) Int. Cl.
*B32B 27/32* (2006.01)
*B32B 9/04* (2006.01)
*B05D 1/40* (2006.01)
*B05D 3/02* (2006.01)

(52) U.S. Cl. ........ 428/220; 428/332; 428/336; 428/448; 427/331; 427/387

(58) Field of Classification Search ........................ None
See application file for complete search history.

(56) References Cited

U.S. PATENT DOCUMENTS

| 4,719,125 | A | 1/1988 | Anello et al. | |
| 7,396,568 | B2 * | 7/2008 | Suzuki et al. | 427/407.1 |

FOREIGN PATENT DOCUMENTS

| EP | 0 218 117 A2 | 9/1986 |
| JP | 62-88327 A | 4/1987 |
| JP | 07-082528 | 3/1995 |
| JP | 09-157594 | 6/1997 |
| JP | 10-194753 | 7/1998 |
| JP | 2002-337263 | 11/2002 |
| JP | 2003-327908 | 11/2003 |
| JP | 2003-336010 | 11/2003 |
| JP | 2003-347294 | 12/2003 |
| JP | 2004-155834 | 6/2004 |
| JP | 2005-343014 | 12/2005 |
| WO | 03/097760 | 11/2003 |
| WO | 2004/039904 | 5/2004 |

OTHER PUBLICATIONS

International Search Report issued in corresponding application No. PCT/JP2005/023177, completed Apr. 6, 2006 and mailed Apr. 18, 2006.
Rikitake, Kataro et al., "Development of Surface Processing Technique for Nonspecific Adsorption Inhibithion," Prepublication paper in Chemical Sensor Research Association held May 2005, Chiba University, Japan.
Yasuzawa, Mikito et al., "Hydrophilic Coating with High Bio-compatibility on Metal Surfaces," Poster Exhibition at Nano Tech 2005 International Nanotechnology Exhibition and Conference, Feb. 23-25, 2005, Tokyo, Japan.
Definition of "Hump", American Heritage Dictionary at web site Answers.com, Jan. 25, 2011, 3 pages.
Definition of "Alcohol", Britannica Online Encyclopedia, Sep. 9, 2011, 20 pages, filed herewith as Exhibit A.
Ganswindt, A., "The Water Molecule", Scientific American Supplement, (2010), 4 pages, filed herewith as Exhibit B.

* cited by examiner

*Primary Examiner* — Sheeba Ahmed
(74) *Attorney, Agent, or Firm* — Griffin & Szipl, P.C.

(57) ABSTRACT

A method for modifying the surface of a substrate includes the following steps: (1) a step for forming a polysilazane coating by applying a polysilazane onto the surface of a substrate; (2) a step for applying an organic compound of which main backbone comprises an organic group represented by the following formula [1]: —[(R)$_m$O]$_n$— (wherein R represents an alkylene group, and m and n respectively represent a positive number of not less than 1) onto the surface of the polysilazane coating; and (3) a step for heating the substrate having undergone the steps (1) and (2), thereby converting the polysilazane to silica and bonding the organic compound to the silica of the silica layer.

32 Claims, 1 Drawing Sheet

METHOD FOR MODIFYING SURFACE OF SUBSTRATE, SUBSTRATE HAVING MODIFIED SURFACE, AND METHOD FOR PRODUCING SAME

This is a National Phase Application in the United States of International Patent Application No. PCT/JP2005/023177 filed Dec. 16, 2005, which claims priority on Japanese Patent Application No. 2004-365903, filed Dec. 17, 2004. The entire disclosures of the above patent applications are hereby incorporated by reference.

TECHNICAL FIELD

The present invention relates to a method for modifying the surface of a substrate, a substrate having a modified surface, and a method for producing the same, specifically relates to a method for modifying the surface of a substrate which can impart hydrophilicity, abrasion resistance, chemical resistance, compatibility with a human body, and so on to the surface of substrates such as metal, a substrate having a modified surface, and a method for producing the same.

BACKGROUND ART

Numerous methods have been proposed heretofore as methods modifying the surface of metal substrates by forming a silica coating on the surface of metal substrates. For example, Japanese Unexamined Patent Application Publication (hereinafter referred to as "JP Kokai") No. S62-88327 (Patent Reference 1) teaches a method for forming a silica film by coating a toluene solution of a polymer derived from an organocyclosilazane onto a silicon wafer, drying the solution at room temperature, and then baking the polymer at high temperature in the presence of oxygen or water vapor. JP Kokai No. H9-157594 (Patent Reference 2) teaches a method for forming a silica coating by coating a xylene solution of perhydropolysilazane onto a stainless steel plate, or a metal, glass, ceramics and so on, and then heating the perhydropolysilazane at 450° C. in atmospheric air.

JP Kokai No. H10-155834 (Patent Reference 3) teaches a method for forming a silica coating by coating a xylene solution of perhydropolysilazane onto a silicon wafer, exposing the coated perhydropolysilazane to an amine compound and water vapor, and then baking the exposed perhydropolysilazane. JP Kokai No. 2004-155834 (Patent Reference 4) teaches a method for forming a silica layer by coating the surface of a metal, glass, plastics and so on with a xylene solution of perhydropolysilazane containing an amine catalyst and leaving to stand at room temperature.

But these methods relate to forming a silica layer on the surface of a metal, glass, plastics and so on to modify it to a heat-resistant, abrasion resistant and corrosion resistant surface. The surface of the substrate obtained by these methods does not have hydrophilic properties and compatibility with a human body. The substrate obtained by these methods is not satisfactory as a substrate used in a contact with a human body, specifically a living body.

JP Kokai No. H7-82528 (Patent Reference 5) teaches a coating solution comprising a mixture of polysilazane and an alcohol (for example, ethanol, ethylenegylcol, propylenegylcol), but the formed silica layer has insufficient hydrophilicity, small hardness, and inferior abrasion resistance.

JP Kokai No. 2003-327908 (Patent Reference 6) teaches an undiluted solution of a hydrophilicity-maintaining agent or hydrophilicity-accelerator comprising an aqueous solution of an anionic surface active agent, an amphoteric surface active agent, and a non-ionic surface active agent. According to this patent reference, overcoating the polysilazane-containing coating with it maintains and promotes the hydrophilicity. But since the anionic surface active agent, amphoteric surface active agent, and non-ionic surface active agent adhere to the surface of the silica layer, such silica layer is not satisfactory as a substrate used in contact with a human body, and has insufficient durability of hydrophilicity.

Whereas there is a trial to modify a metal substrate surface to a hydrophilic surface, but it is difficult to bond such hydrophilic polymer to a metal surface directly. No substrate with surface characteristics such as hydrophilicity, chemical resistance, and compatibility with a human body is provided.
[Patent Reference 1] JP Kokai No. S62-88327
[Patent Reference 2] JP Kokai No. H9-157594
[Patent Reference 3] JP Kokai No. H10-194753
[Patent Reference 4] JP Kokai No. 2004-155834
[Patent Reference 5] JP Kokai No. H7-82528
[Patent Reference 6] JP Kokai No. 2003-327908

DISCLOSURE OF THE INVENTION

Problems to be Solved by the Invention

The present inventors have intensively studied, have discovered that a substrate having a modified surface having excellent hydrophilicity, abrasion resistance, chemical resistance, compatibility with a human body, particularly, biocompatibility and the like can be prepared by forming a polysilazane coating on the surface of a substrate, contacting a specific organic compound with the polysilazane coating, and then heating them to convert the polysilazane coating to silica coating, thus have completed the present invention. The object of the present invention is to provide a method for modifying the surface of a substrate, a substrate having a modified surface, and a method for producing the same, specifically relates to a method for modifying the surface of a substrate which can impart hydrophilicity, abrasion resistance, chemical resistance, compatibility with a human body, particularly, biocompatibility and so on to the surface of substrates such as metal, a substrate having a modified surface, and a method for producing the same.

Means for Solving the Problems

The present invention relates to the following.
[1] A method for modifying the surface of a substrate which comprises the following steps;
(1) a step for forming a polysilazane coating by applying a polysilazane onto the surface of a substrate; (2) a step for applying an organic compound of which main backbone comprises an organic group represented by the following formula [1]: —[(R)$_m$O]$_n$— (wherein R represents an alkylene group, and m and n respectively represent a positive number of not less than 1) onto the surface of the polysilazane coating; and (3) a step for heating the coated substrate having undergone the aforementioned steps, thereby converting the polysilazane to silica and bonding the organic compound to the silica of the silica layer.
[2] The method for modifying the surface according to [1], wherein the substrate is an inorganic substrate.
[3] The method for modifying the surface according to [2], wherein the inorganic substrate is a metal, glass or ceramic.
[4] The method for modifying the surface according to [1], wherein the organic compound is an alkyleneglycol or a polyalkyleneglycol.

[5] The method for modifying the surface according to [1], wherein the polysilazane has a unit represented by the formula:

as the repeating unit, and the alkyleneglycol or polyalkyleneglycol is represented by the general formula:

$$HO[R^4O]_nH \qquad (2)$$

(wherein $R^4$ represents an alkylene group having 1 to 4 carbon atoms, and n is a value of 1 or more) or the general formula $$HO[R^5O]_nR^6 \qquad (3)$$

(wherein $R^5$ represents an alkylene group having 1 to 4 carbon atoms, $R^6$ represents an alkyl group having 1 to 3 carbon atoms, and n is a value of 1 or more)

[6] The method for modifying the surface according to [5], wherein the polysilazane is perhydropolysilazane, the alkyleneglycol represented by the formula (2) or the formula (3) is ethyleneglycol, and the polyalkyleneglycol represented by the formula (2) or the formula (3) is polyethyleneglycol.

[7] The method for modifying the surface according to [1], [5] or [6], wherein the polysilazane contains a catalytic amount of a catalyst for accelerating the conversion to silica.

[8] The method for modifying the surface according to [6], wherein the number average molecular weight of polyethyleneglycol is from 90 to 2,000.

[9] The method for modifying the surface according to [7], wherein the catalyst for accelerating the conversion to silica is an amine-based catalyst.

[10] The method for modifying the surface according to [1], [4], [5], [6] or [7], wherein the percentage in conversion from the polysilazane to silica is not less than 80%.

[11] The method for modifying the surface according to [1], [4], [5], [6] or [7], wherein the thickness of the silica layer is 10 to 1500 nm.

[12] A substrate with a modified surface characterized by the fact that a silica layer is formed on the surface of a substrate, and a layer of an organic compound of which main backbone comprises an organic group represented by the following formula [1]: —[(R)$_m$O]$_n$— (wherein R represents an alkylene group, and m and n respectively represent a positive number of not less than 1) is formed on the surface of the silica layer to which the organic compound layer bonds.

[13] The substrate according to [12], wherein the thickness of the silica layer is 10 to 1500 nm.

[14] The substrate according to [12], wherein the organic compound layer has a domain structure.

[15] The substrate according to [12], wherein the substrate is an inorganic substrate.

[16] The substrate according to [15], wherein the inorganic substrate is a metal, glass, or ceramics.

[17] The substrate according to [12], wherein the silica layer is derived from the polysilazane, and the organic compound layer is derived from an alkyleneglycol or polyalkyleneglycol.

[18] The substrate according to [17], wherein the polysilazane comprises a repeating unit represented by the formula:

and the alkyleneglycol or polyalkyleneglycol is represented by the general formula:

$$HO[R^4O]_nH \qquad (2)$$

(wherein $R^4$ represents an alkylene group having 1 to 4 carbon atoms, n is a value of 1 or more) or the general formula:

$$HO[R^5O]_nR^6 \qquad (3)$$

(wherein $R^5$ represents an alkylene group having 1 to 4 carbon atoms, $R^6$ represents an alkyl group having 1 to 3 carbon atoms, and n is a value of 1 or more)

[19] The substrate according to [18], wherein the polysilazane is perhydropolysilazane, the alkyleneglycol represented by the formula (2) or the formula (3) is ethyleneglycol, and the polyalkyleneglycol represented by the formula (2) or the formula (3) is polyethyleneglycol.

[20] The substrate according to [18], wherein the silica layer on the surface of the substrate has a hydrophilic surface.

[21] The substrate according to [20], wherein a contact angle of a water droplet on the surface of the silica layer is 10 to 50 degrees.

[22] The substrate according to [21], wherein the substrate with the modified surface is a material constituting a component or article which is used in contact with a human body.

[23] A method for producing a substrate with a modified surface characterized by the fact that a silica layer is formed on the surface of a substrate, and a layer of an organic compound of which main backbone comprises an organic group represented by the following formula [1]: —[(R)$_m$O]$_n$— (wherein R represents an alkylene group, and m and n respectively represent a positive number of not less than 1) is formed on the surface of the silica layer to which the organic compound layer bonds, which comprises the following steps;

(1) a step for forming a polysilazane coating by applying a polysilazane onto the surface of a substrate;

(2) a step for forming a layer of an organic compound of which main backbone comprises an organic group represented by the following formula [1]: —[(R)$_m$O]$_n$— (wherein R represents an alkylene group, and m and n respectively represent a positive number of not less than 1) onto the surface of the polysilazane coating; and (3) a step for converting the polysilazane coating on the surface of the substrate having undergone the aforementioned steps into a silica layer to bond the organic compound to the silica layer.

[24] The method for producing a substrate according to [23], wherein the formation of a polysilazane coating is accomplished by coating a polysilazane solution, the formation of an organic compound layer is accomplished by coating the organic compound itself or a solution thereof, and the conversion of the polysilazane coating to silica layer is accomplished by heating.

[25] The method for producing a substrate according to [23], wherein the organic compound is an alkyleneglycol or polyalkyleneglycol.

[26] The method for producing a substrate according to [25], wherein the polysilazane has a unit represented by the formula:

as the repeating unit, and the alkyleneglycol or polyalkyleneglycol is represented by the general formula:

$$HO[R^4O]_nH \qquad (2)$$

(wherein $R^4$ represents an alkylene group having 1 to 4 carbon atoms, n is a value of 1 or more) or the general formula:

$$HO[R^5O]_nR^6 \qquad (3)$$

(wherein $R^5$ represents an alkylene group having 1 to 4 carbon atoms, $R^6$ represents an alkyl group having 1 to 3 carbon atoms, and n is a value of 1 or more)

[27] The method for producing a substrate according to [26], wherein the polysilazane is perhydropolysilazane, the alkyleneglycol represented by the formula (2) or the formula (3) is ethyleneglycol, and the polyalkyleneglycol represented by the formula (2) or the formula (3) is polyethyleneglycol.

[28] The method for producing a substrate according to [23], [24][25], [26] or [27], wherein the polysilazane contains a catalytic amount of a catalyst for accelerating the conversion to silica.

[29] The method for producing a substrate according to [28], wherein the catalyst for accelerating the conversion to silica is an amine-based catalyst.

Advantageous Effects of the Invention

The inventive method for modifying the surface of a substrate is characterized by imparting excellent hydrophilicity, abrasion resistance, chemical resistance, compatibility with a human body, particularly, biocompatibility and so on to the substrate surface. The inventive substrate with the modified surface is characterized by having the surface with excellent hydrophilicity, abrasion resistance, chemical resistance, compatibility with a human body, and so on. The inventive method for producing the substrate with the modified surface is characterized by being able to produce such substrate efficiently and simply.

BEST MODE FOR CARRYING OUT THE INVENTION

Substrates of which surface will be modified in the present invention include various inorganic substrates (materials) or organic substrates (materials). Examples of materials for inorganic substrates include steal, stainless steal, aluminum, duralumin, titanium, titanium alloy, silver, and other metals; glass, quartz, ceramics, pottery, porcelain, and stone. Examples of materials for organic substrates include polyethylene resin, polypropylene resin, acrylic resin, polyamide resin, polyester resin, polycarbonate resin, polyvinyl alcohol, POVAL resin, ABS resin, polyimide resin, epoxy resin, polyurethane resin, and other synthetic resins; synthetic wood; a bamboo, wood, and other natural materials. Examples of shapes of the inorganic substrates include a plate, sheet, film, cloth, block, and a shape of a container, component and article. A suitable one should be selected from the aforementioned materials and utilized, considering places where the surface-modified substrate of the present invention is applied, and applications of a component or article comprising the surface-modified substrate of the present invention.

The polysilazane which is coated on the surface of a substrate in step (1) for forming a polysilazane coating on the surface of a substrate (hereinafter referred to as step (1)) is a polymer having repeated Si—N(silicon-nitrogen) linkages. Its type is not specifically limited so long as it can be easily converted to silica. The polysilazane that has Si—N(silicon-nitrogen) linkages and two hydrogen atoms bonded to the silicon atom of Si—N linkage can be easily converted to silica. Molecular structures of such polysilazane include linear chain, branched linear chain, branched, cyclic, crosslinked structure, and a combination of these. A simple polysilazane or a mixture of these polysilazanes can be utilized in the present invention. A representative example of these polysilazanes includes a polymer comprising repetitions of the silazane linkage represented by the formula (4) shown below. Here the polymer includes an oligomer.

[chemical formula 4]

(4)

(4) (wherein $R^1$, $R^2$ and $R^3$ are hydrogen atom or alkyl group with 1 to 8 carbon atoms such as methyl, ethyl, propyl, and butyl group)

From the standpoint of easiness to be converted to silica, a polysilazane containing the unit in which $R^1$ and $R^2$ are hydrogen atoms is preferable, a polysilazane in which all of $R^1$ and $R^2$ in the molecule are hydrogen atoms is more preferable, and specifically a polysilazane in which all of $R^1$, $R^2$ and $R^3$ in the molecule are hydrogen atoms is more preferable. The polysilazane comprising the underwritten unit (5) in which all of $R^1$, $R^2$ and $R^3$ in the formula (4) are hydrogen atoms is called perhydropolysilazane.

[chemical formula 5]

(5)

It is said that the perhydropolysilazane has a chemical structural part represented by the formula (6);

A part of hydrogen atoms bonded to silicon atoms can be replaced by a hydroxyl group or hydroxyl groups in the aforementioned perhydropolysilazane. The perhydropolysilazane can be easily synthesized by reacting dihydrogendichlorosilane with an organic amine (for example, pyridine or picoline) to form an adduct followed by reacting the adduct with ammonia.

Such polysilazane, specifically perhydropolysilazane usually has a number-average molecular weight of from 100 to 50,000, and preferably a number-average molecular weight of from 200 to 2,500 in respect of volatility when heated and solubility in solvents.

The polysilazane, specifically perhydropolysilazane may contain a small amount of a catalyst for accelerating the conversion to silica. Examples of the catalyst for accelerating the conversion to silica include an organic amine compound, organic acid, inorganic acid, metal salt of a carboxylic acid, and organic metal complex. Among them, organic amine compounds are preferable. Examples of the organic amine compounds include 1-methylpiperazine, 1-methylpiperidine, 4,4'-trimethylenedipiperidine, 4,4'-trimethylene-bis(1-methylpiperidine), diazabicyclo[2,2,2]octane, cis-2,6-dimethylpiperazine, 4-(4-methyl piperidine) pyridine, pyridine, dipyridine, α-picoline, β-picoline, γ-picoline, piperidine, lutidine, pyrimidine, pyridazine, 4,4'-trimethylene-dipyridine, 2-(methylamino)pyridine, pyrazine, quinoline, quinoxaline, triazine, pyrrole, 3-pyrroline, imidazole, triazole, tetrazole, 1-methylpyrrolidine, and other nitrogen-containing cyclic organic amines; methylamine, dimethylamine, trimethylamine, ethylamine, diethylamine, triethylamine, propylamine, dipropylamine, tripropylamine, butylamine, dibutylamine, tributylamine, pentylamine, dipentylamine, tripentylamine, hexylamine, dihexylamine, trihexylamine, heptylamine, diheptylamine, octylamine, dioctylamine, trioctylamine, phenylamine, diphenylamine, triphenylamine, and other aliphatic amines or aromatic amines; DBU(1,8-diazabicyclo[5,4,0]7-undecene), DBN(1,8-diazabicyclo[4,3,0]5-nonene), 1,5,9-triazacyclododecane, 1,4,7-triazacyclononane. The polysilazane, specifically perhydropolysilazane contains a catalyst for accelerating the conversion to silica preferably in the range from 0.1 to 10 percent by weight of the polysilazane, specifically perhydropolysilazane.

When the polysilazane, specifically perhydropolysilazane, is coated onto a substrate in step (1), it is preferable to coat a solution prepared by dissolving it in a solvent. Solvents which can dissolve it to form a flowable solution, and neither changes its quality nor decomposes it are suitable for that purpose. Examples of such solvents include toluene, xylene, hexylene, and other aromatic hydrocarbons; ethylbutylether, dibutylether, dioxane, tetrahydrofuran, and other ethers; hexane, heptane, cyclohexane, and other aliphatic hydrocarbons.

These organic solvents can be used singly or as a mixture of two or more solvents. The solid content in such polysilazane solution, specifically perhydropolysilazane solution is preferably in the range from 0.1 to 35% by weight, and more preferably in the range from 0.2 to 10% by weight.

Conventional coating methods, i.e., dipping, roll-coating, blade coating, brush coating, spraying, flow coating, spin coating and the like are utilized for forming a polysilazane coating, specifically perhydropolysilazane coating by applying a polysilazane, specifically perhydropolysilazane onto the surface of a substrate in step (1). Polishing, defatting, or surface-treating by means of various blasting agents of the substrate before coating can enhance the adhesion of the polysilazane, specifically perhydropolysilazane to (9) the substrate. In case a polysilazane solution, specifically perhydropolysilazane solution has been coated, drying by air or warm air after coating is recommended.

Next, an organic compound of which main backbone comprises an organic group represented by the following formula [1]: —[(R)$_m$O]$_n$— (wherein R represents an alkylene group, and m and n respectively represent a positive number of not less than 1) is coated onto the surface of the polysilazane coating on the surface of the substrate having undergone the step (1) to form an organic compound layer.

The organic compound of which main backbone comprises an organic group represented by the following formula [1]: —[(R)$_m$O]$_n$— (wherein R represents an alkylene group, and m and n respectively represent a positive number of not less than 1), which has been utilized in the aforementioned step (2) for applying an organic compound of which its main backbone comprises an organic group represented by the following formula [1]: —[(R)$_m$O]$_n$— (wherein R represents an alkylene group, and m and n respectively represent a positive number of not less than 1) onto the surface of the polysilazane coating, bonds to silica formed by conversion of the polysilazane, specifically perhydropolysilazane, to impart hydrophilicity.

Representative examples of the organic compound represented by the general formula (1) are an alkyleneglycol or polyalkyleneglycol. In respect of bonding to silica formed by conversion of the polysilazane, specifically perhydropolysilazane, the presence of hydroxyl groups at both molecular terminals or one molecular terminal is preferable. The presence of hydroxyl groups at both molecular terminals is preferable than the presence of one alkoxy group at one molecular terminal in respect of bonding to silica.

An alkyleneglycol or polyalkyleneglycol represented by the formula:

$$HO[R^4O]_n—H \qquad (2)$$

(wherein $R^4$ represents an alkylene group with 1 to 4 carbon atoms, and n represents a positive number of not less than 1) is preferable among them. An alkyleneglycol or polyalkyleneglycol represented by the formula:

$$HO[R^5O]_n—R^6 \qquad (3)$$

(wherein $R^5$ represents an alkylene group with 1 to 4 carbon atoms, $R^6$ represents an alkyl group with 1 to 3 carbon atoms, and n represents a positive number of not less than 1) is also preferable.

In the general formula (1), m is ordinarily 1, R is an alkylene group such as methylene, ethylene, propylene, butylene, pentylene, amylene, hexylene and the like. An alkylene group with 1 to 8 carbon atoms is preferable in respect of imparting hydrophilicity, and an alkylene group with 1 to 4 carbon atoms is more preferable in respect of imparting (10) hydrophilicity. In the organic compound where n is 2 or more, ethylene group and propylene group or butylene group can coexist so long as the ethylene group is the main constituent. $R^4$ is methylene, ethylene, propylene, or butylenes with ethylene being preferred, $R^5$ is methylene, ethylene, or propylene with ethylene being preferred, and $R^6$ is methyl, ethyl, or propyl, but can be butyl or pentyl group in a polyethylegylcol having a large polymerization degree. The n is a positive number not less than 1, and preferably 2 or more and 45 or less.

Examples of such organic compounds include ethyleneglycol, ethyleneglycol monomethylether, ethyleneglycol monoethylether, propyleneglycol, butyleneglycol, and other monomers; polyethyleneglycol, polyethyleneglycol monomethylether, polyethyleneglycol monoethylether, polypropyleneglycol, polybutyleneglycol, polyethylenepropyleneglycol, and other polymers with polyethyleneglycol(polyoxyethylene) being preferred. Polyethyleneglycol is a polymer represented by the formula:

$$HO-[CH_2CH_2O]_n-H \qquad (7)$$

(wherein n is a positive number not less than 2, and it ranges from liquid to a wax-like solid at ambient temperatures.

Organic compounds with a number-average molecular weight of from 90 to 2000 are preferably used in the present invention. Since such organic compounds are liquid, it is preferred directly to apply onto the polysilazane coating, specifically perhydropolysilazane coating. Organic compounds which are viscose liquid or waxy is recommended to coat after dissolving in an appropriate solvent or diluting with an appropriate solvent. Solvents for that purpose are preferably selected from solvents which do not dissolve or scarcely dissolve the polysilazane, specifically perhydropolysilazane, and do not decompose it.

Such organic compounds dissolve well in water, hydrophilic organic solvents, polar organic solvents (for example ethers, carboxylic acid esters), but should avoid solvents with hydroxyl group such as alcohol and phenol. Aromatic hydrocarbon solvents such as xylene can be utilized for dissolving or diluting since the polysilazane, specifically perhydropolysilazane is soluble in some degree in them. Dibutylether, tetrahydrofuran, xylene, toluene and benzene are exemplified as solvents for dissolving or diluting the organic compound of which main backbone comprises an organic group represented by the following formula [1]: $-[(R)_mO]_n-$ (wherein R represents an alkylene group, and m and n respectively represent a positive number of not less than 1), specifically the alkyleneglycol or polyalkyleneglycol represented by the formula:

$$HO[R^4O]H \qquad (2)$$

and $$HO[R^4O]R^6 \qquad (3).$$

Examples of methods for applying or coating an organic compound of which main backbone comprises an organic group represented by the formula [1]: $-[(R)_mO]_n-$ (wherein R represents an alkylene group, and m and n respectively represent a positive number of not less than 1) onto the surface of the polysilazane, specifically perhydropolysilazane coating formed on the surface of the substrate by the step (1) include conventional coating methods, i.e., dipping, rollcoating, blade coating, brush coating, spraying, flow coating, spin coating and the like. It is preferable to leave to stand for a while after coating in order to enhance the reactivity.

Finally in the step (3) for heating the substrate having undergone steps (1) and (2), thereby converting the polysilazane into silica and bonding the organic compound to the silica of the silica layer, the substrate having undergone the preceding two steps is subjected to heating etc. to convert the polysilazane, specifically perhydropolysilazane to silica. The heating temperature is preferably in the range from 100° C. to 400° C., and more preferably in the range from 100° C. to 300° C. In case the polysilazane, specifically perhydropolysilazane contains a catalyst for accelerating the conversion to silica, the heating temperature may be lower than the aforementioned heating temperature, and preferably in the range from 50° C. to 200° C. It is preferable to select a heating temperature and heating time period so that the organic compound of which main backbone comprises an organic group represented by the following formula [1] rarely decomposes. In case the substrate is organic, it is preferable to select a condition where the substrate will not thermally decompose and will not change the quality. Heating in air is preferable since the air contains oxygen gas and water vapor. Air can be replaced by oxygen gas-containing nitrogen gas, water vapor-containing nitrogen gas, oxygen gas and water vapor-containing nitrogen gas. The polysilazane, specifically perhydropolysilazane can be converted to silica by irradiation with electron beams.

The percentage in conversion from the polysilazane to silica is preferably not less than 80%, more preferably not less than 90%, and most preferably in the range 98 to 100%.

In the following, the substrate with the modified surface of the present invention is explained. The modified substrate of the present invention has a thin silica layer formed on the surface of a substrate. The silica layer adheres or bonds to the surface of a substrate. A layer of an organic compound represented by the formula:

$$-[(R)_mO]_n- \qquad (1)$$

(wherein R represents an alkylene group, and m and n respectively represent a positive number of not less than 1) is formed on the surface part of the silica layer where the layer of the organic compound bonds to silica of the silica layer. There is an organic compound layer on the surface part of the silica layer. There is a silica layer on the substrate surface in principle, a layer of silica bonded to the organic compound on the silica layer, and subsequently a layer consisting of the organic compound only on the layer of silica bonded to the organic compound. The concentration of the organic compound becomes higher as approaches to the surface in the silica bonded to the organic compound. The silica of the silica layer comprises a repeating unit of the four-functional siloxane unit represented by the formula; $SiO_{4/2}$. Examples of methods for forming such silica layer include hydrolyzing and condensing a tetraalkoxysilane such as tetramethoxysilane, tetraethoxysilane, and the like, and a method obtaining from a polysilazane, specifically perhydropolysilazane. A silica layer obtained from a polysilazane, specifically perhydropolysilazane, is preferable.

The thickness of a silica layer on a substrate surface is preferably in the range from 1 to 3,000 nm, and more preferably in the range from 10 to 1,500 nm. But it is preferably in the range from 1 to 500 nm, depending on the kind or surface condition of a substrate. It is not easy to coat the bumpy surface of a substrate completely with a silica layer with a thickness of less than 1 nm. Such thin coating layer is apt to reduce hydrophilicity and other functional properties. A silica layer with a thickness exceeding 3,000 nm may have a lower uniformity and is apt to suffer from cracks. The thickness of the silica layer in the underwritten working examples is in the range about from 120 to 150 nm. The thickness of a silica layer on a substrate surface can be measured by observing the cross-section thereof with a field emission scanning electron microscope.

A layer of an organic compound of which main backbone comprises an organic group represented by the following formula [1]: —[(R)$_m$O]$_n$— (wherein R represents an alkylene group, and m and n respectively represent a positive number of not less than 1) chemically bonds to the surface of the silica layer, surface layer part of the silica layer. A terminal carbon atom of the organic compound covalently bonds to a silicon atom of the silica via oxygen atom.

The fact that the organic compound chemically bonds to the surface of the silica layer, particularly a terminal carbon atom of the organic compound covalently bonds to a silicon atom of the silica via oxygen atom can be known by measurements etc. with a genera-purpose Fourier transform infrared spectrophotometer (a product of JASCO Corporation, genera-purpose Fourier transform infrared spectrophotometer, RAS measurement (highly sensitive measurement), PAS measurement (photoacoustic method), X-ray photoelectron spectrometer (a product of Shimadzu Corporation, Shimadzu ESCA-1000AX), and can be presumed from test results in Working Example 6. This (13) organic compound layer preferably forms areas or configurations called a domain structure, mushroom-shaped structure or hump-like structure. The domain structure, mushroom-shaped structure or hump-like structure enhances the hydrophilicity.

This organic compound layer is preferably a layer where oxyalkylene groups originated in an alkyleneglycol or polyalkyleneglycol, particularly the alkyleneglycol or polyalkyleneglycol represented by the formula $$\text{HO}[R^4O]_n\text{—H} \tag{2}$$

(wherein $R^4$ represents an alkylene group with 1 to 4 carbon atoms, and n represents a positive number of not less than 1) or the formula $$\text{HO}[R^5O]_nR^6 \tag{3}$$

(wherein $R^5$ represents an alkylene group with 1 to 3 carbon atoms, $R^6$ represents an alkyl group with 1 to 3 carbon atoms and n represents a positive number of not less than 1) reside, particularly a layer where organic groups represented by $$\text{—[CH}_2\text{CH}_2\text{O]}_n\text{—H} \tag{8}$$

(wherein n represents a positive number of not less than 2) originated in polyethyleneglycol reside.

Therefore the substrate surface has not only excellent hydrophilicity, but also excellent durability thereof. Namely, the substrate surface is not peeled even if the substrate surface is washed with water repeatedly, and is strongly rubbed with a cloth.

The formation of a silica layer on the substrate surface can be presumed by increase of a pencil hardness (pencil-scratching value) in accordance with 8.4.2 of JIS K5400. The surface of a test piece made of stainless steel (SUS 304) has a pencil hardness of 6B, but the surface of a test specimen prepared by forming a perhydropolysilazane coating on a test piece made of stainless steel (SUS 304), applying a polyethyleneglycol onto the coating, and heating at 150° C. for 30 minutes has a pencil hardness in the range from 2H to 3H. This means significant increase in the pencil hardness. The modified substrate surface layer has excellent abrasion resistance.

In addition, the existence of a silica layer, polyoxyalkylene layer, and intermediate layer thereof can be known by a glow-discharge optical emission spectrometry. Namely, it can be known by glow-discharging a silica layer/polyoxyalkylene layer or silica layer/intermediate layer/polyoxyalkylene layer, and followed by measuring changes of an optical intensity of each element such as silicon, carbon, oxygen, hydrogen and the like which is associated with sputtering time.

The modified substrate surface has excellent chemical resistance. The chemical resistance can be known by dipping a test specimen into a chemicals or a solution thereof, taking out it after leaving to stand for a predetermined time period, and observing a surface condition of the taken test specimen, or measuring an angle of contact with water. Examples of chemicals, which the modified substrate surface can withstand, include various kinds of organic solvents for dissolving the polysilazane and polyalkyleneglycol, saline solution, normal saline solution, and disinfectant ethanol.

Compatibility with a human body of the modified substrate surface, particularly biocompatibility can be evaluated by a test for platelet adhesion to the surface of a test specimen. A surface of a test specimen is contacted with platelet-rich blood plasma obtained from human blood at 37° C. for one hour, followed by washing the surface of the test specimen with water to remove the platelet-rich blood plasma, and the degree of adhesion of the platelets and proteins to the surface of the test specimen is observed by means of a scanning electron microscope [SEM] after drying in air. No adhesion or slight adhesion of the platelets and proteins allows to judge that the compatibility with a human body (biocompatibility) is excellent. Adhesion of many platelets and proteins, and adhesion of a small number of large platelets or/and protein particles allows to judge that the compatibility with a human body (biocompatibility) is inferior. It can be evaluated also by a test for protein adsorption to the surface of a test specimen. Namely, a test specimen is immersed in an albumin aqueous solution or a fibrinogen aqueous solution to adsorb proteins, and the test specimen adsorbing the proteins is immersed in a dilute aqueous solution of sodium hydroxide containing a small amount of a surface active agent to remove the proteins. A fluorescent dye solution is added to the aqueous solution of the removed proteins, of which fluorescence is measured. Since small fluorescent intensity means a small amount of adsorbed proteins, it allows to judge that the compatibility with a human body (biocompatibility) is good. Since large fluorescent intensity means a large amount of adsorbed proteins, it allows to judge that the compatibility with a human body (biocompatibility) is inferior.

Examples of substrates on which a silica layer is laminated include the similar ones as the substrates exemplified in the aforementioned method for modifying the substrate surface.

Since the inventive substrate with the modified surface has the surface having excellent hydrophilicity, durability thereof, abrasion resistance, and chemical resistance, it is suitable as a metal column, capillary, column packing, tube, and other components for analysis equipment; a glass ware for experiments, spatula made of stainless steel, petri dish for fungus incubation, and other instruments for physics and chemistry; a food ware, knife, folk, spoon, and other living wares; and a tile, pipe, sheet glass, screen door, and other resources for housing environment.

Since it has excellent compatibility with a human body, particularly biocompatibility, it is suitable as materials constituting components and articles which are utilized in contact with a human body, particularly biological constituents (for example, blood, lymph fluid). Since it does not cause symptoms such as metal allergy on a human body, and platelets and proteins hardly adhere to it, it is suitable as an injection needle, catheter, surgical knife, scissors, clip, artificial joint, artificial bone, screw, nut, plate, fixing device, wire, stent-graft, and other medical components, tools, or instruments; an implant, bracket, and other components for dental treatments; a pierced earring, earring, necklace, and other ornamental components; scissors for hair dressing and beautification.

EXAMPLES

In the following, the present invention is explained in detail by working examples, comparative examples, and tests for evaluating biocompatibility. Surface characteristics were measured, evaluated and observed as follows.

[Hydrophilicity of Surface of Test Specimen]

A water droplet was dropped onto the surface of a test specimen, and an angle of contact with the water droplet was measured by means of Q1 optical mirror type contact angle meter (a product of KYOWA INTERFACE SCIENCE CO., LTD.).

[Pencil Hardness of Test Specimen Surface (Pencil-Scratching Value)]

The surface of a test specimen was scratched with a lead of a pencil with a hardness of 6B to 9H in accordance of 8.4.2 of JIS K5400, and a pencil hardness was indicated by the largest hardness not to cause a bruise.

[Physical Modification State of Specimen Surface]

Roughness of the surface of a test specimen was observed by means of Atomic Force Surface Roughness Meter (a product of Seiko Instrument Co., Ltd., Atomic Surface Roughness Meter Nanopics NPX100).

[Test for Platelet Adhesion to Surface of Test Specimen]

A surface of a test specimen was contacted with platelet-rich blood plasma obtained from human blood at 37° C. for one hour, followed by washing the surface of the test specimen with water to remove the platelet-rich blood plasma, and the degree of adhesion of platelets and proteins to the surface of the test specimen was observed by means of a scanning electron microscope [SEM] after drying in air.

[Test for Protein Adhesion to Surface of Test Specimen]

A test specimen was immersed in PBS buffered solution for 12 hours, and the taken out test specimen was immersed in an aqueous solution of albumin in a concentration of 1.0 mg/ml or an aqueous solution of fibrinogen in a concentration of 0.2 mg/ml at 30° C. for one hour to adsorb proteins to the surface of the test specimen. The test specimen adsorbing the proteins was rinsed with a deionized water, was immersed in a 0.01N NaOH aqueous solution containing 1% by weight of Triton X-100 and 1% by weight of dodecyl sodium sulphate, and the aqueous solution with the test specimen was centrifuged at 100 rpm for one hour to remove the proteins adsorbed on the surface of the test specimen. The test specimen was taken out from the 0.01N NaOH aqueous solution of containing the de-adsorbed proteins, and a 0.05M boric acid KCl aqueous solution was added to the 0.01N NaOH aqueous solution to control pH thereof to 9.3 (weak alkaline). Next, 2 ml of the resulting aqueous weak alkaline solution was added into a four-direction cell of a fluorescent spectrophotometer, and 0.5 ml of fluorescamine solution dissolved in an acetone aqueous solution (mixing ratio of acetone to water was 3:2) was added to the four-direction cell to carry out fluorescent measurement. The fluorescent measurement of the albumin was carried out under the condition of a fluorescent wave length of 590 nm, and an excitation wavelength of 520 nm. The fluorescent measurement of the fibrinogen was carried out under the condition of a fluorescent wavelength of 490 nm, and an excitation wavelength of 430 nm.

Working Example 1

The surface (contact angle with water: 79 degrees) of a test plate made of stainless steel [SUS304] was coated with a xylene solution of perhydropolysilazane comprising —($SiH_2$—NH)— as the repeating unit (a product of Clariant Japan, product name: NP-110, containing an amine-type catalyst) in a concentration of 2% by weight, where the coated amount was an amount sufficient to form a perhydropolysilazane coating with a thickness of from 100 to 180 nm. The coated test plate was left to stand for air-drying. Immediately after removal of the xylene, a xylene solution of polyethyleneglycol (the number average molecular weight, hereinafter referred to as Mw: 600) in a concentration of 2% by weight was coated onto the perhydropolysilazane coating, and the resulting coated test plate was left to stand in atmosphere at room temperature for one hour followed by being put into an electrical chamber to heat it for 30 minutes in 150° C. air.

Figure 1:
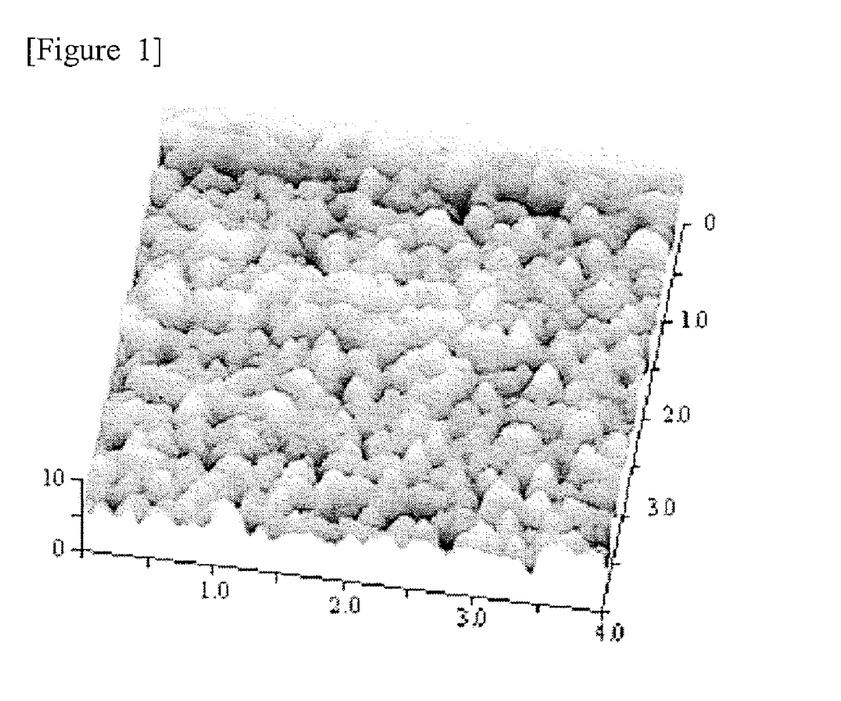
FIG. 1 is a photographic image (AFM image) of the surface of the silica layer of the test specimen in Example 1 which was observed by means of an atomic force surface roughness meter. The unit in the photographic image is nm.

After cooling, distilled water was streamed over the surface of a silica layer of this test panel to wash down the polyethyleneglycol, which was not bonded to the silica layer. The surface of the silica layer of the washed test panel was wiped with paper impregnated with distilled water to remove the polyethyleneglycol, which was not bonded to the silica layer, and then the wiped test plate was left to stand in atmosphere at room temperature for 24 hours. When the contact angle of water on the surface of the silica layer (to which the polyethyleneglycol layer bonded) of the resultant test specimen was measured, the value was 22 degrees. The pencil hardness of the surface of the silica layer was 2H or 3H. Physical states of the surface of the silica layer were observed by means of an atomic force surface roughness meter to find the formation of domain structures based on the polyethyleneglycol (see FIG. 1). The surface of the silica layer of the test specimen was intensively rubbed with Kim Wipe (registered trade mark of Kimberly Clark, made of unwoven fabric) ten or more times, but the surface silica layer was not peeled, and the hydrophilicity thereof did not decrease.

Working Example 2

The surface (contact angle with water: 79 degrees) of a test plate made of stainless steel [SUS304] was coated with a xylene solution of perhydropolysilazane comprising —($SiH_2$—NH)— as the repeating unit (a product of Clariant Japan, product name: NP-110, containing an amine-type catalyst) in a concentration of 2% by weight, where the coated amount was an amount sufficient to form a perhydropolysilazane coating with a thickness of 100 to 180 nm. The coated test plate was left to stand for air-drying. Immediately after removal of the xylene, a xylene solution of polyethyleneglycol (Mw: 200) in a concentration of 2% by weight was coated onto the perhydropolysilazane coating, and the resulting coated test plate was left to stand in atmosphere at room temperature for one hour followed by being put into an electrical chamber to heat it for 30 minutes in 150° C. air.

Figure 2:
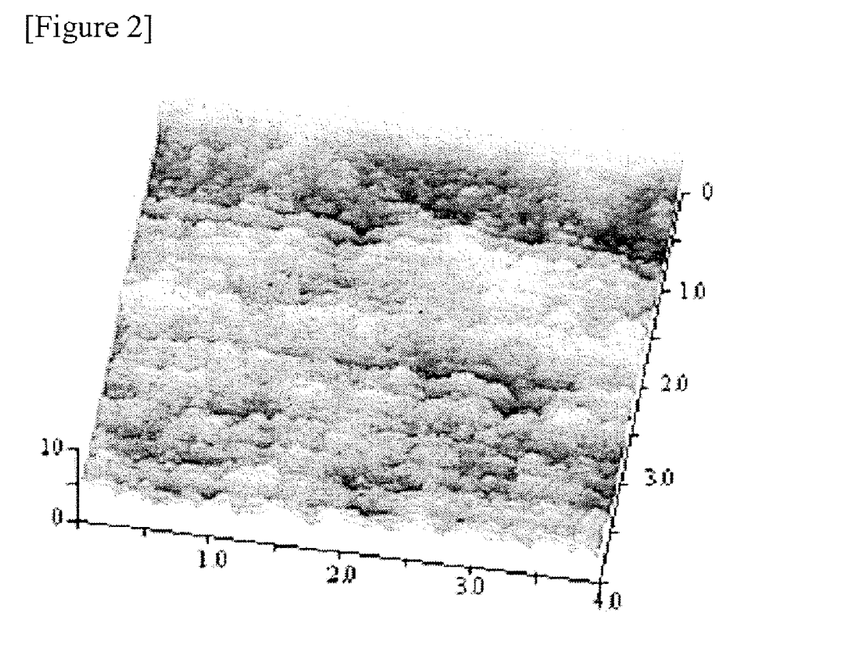
FIG. 2 is a photographic image (AFM image) of the surface of the silica layer of the test specimen in Example 2 which was observed by means of an atomic force surface roughness meter. The unit in the photographic image is nm.

After cooling, distilled water was streamed over the surface of a silica layer of this test panel to wash down the polyethyleneglycol, which was not bonded to the silica layer. The surface of the silica layer of the washed test panel was wiped with paper impregnated with distilled water to remove the polyethyleneglycol, which was not bonded to the silica layer, and then the wiped test plate was left to stand in atmosphere at room temperature for 24 hours. When the contact angle of water on the surface of the silica layer (to which the polyethyleneglycol layer bonded) of the resultant test specimen was measured, the value was 28 degrees. The pencil hardness of the surface of the silica layer was 2H or 3H. Physical states of the surface of the silica layer were observed by means of an atomic force surface roughness meter to find the formation of domain structures based on the polyethyleneglycol (see FIG.

2). The surface of the silica layer of the test specimen was intensively rubbed with Kim Wipe (registered trade mark of Kimberly Clark, made of unwoven fabric) ten or more times, but the surface silica layer was not peeled, and the hydrophilicity thereof did not decrease.

Working Example 3

The surface (contact angle with water: 79 degrees) of a test plate made of stainless steel [SUS304] was coated with a xylene solution of perhydropolysilazane comprising —(SiH$_2$—NH)— as the repeating unit (a product of Clariant Japan, product name: NP-110, containing an amine-type catalyst) in a concentration of 2% by weight, where the coated amount was an amount sufficient to form a perhydropolysilazane coating with a thickness of 100 to 180 nm. The coated test plate was left to stand for air-drying. Immediately after removal of the xylene, a xylene solution of polyethyleneglycol (Mw: 100) in a concentration of 2% by weight was coated onto the perhydropolysilazane coating, and the resulting coated test plate was left to stand in atmosphere at room temperature for one hour followed by being put into an electrical chamber to heat it for 30 minutes in 150° C. air.

After cooling, distilled water was streamed over the surface of a silica layer of this test panel to wash down the polyethyleneglycol, which was not bonded to the silica layer. The surface of the silica layer of the washed test panel was wiped with paper impregnated with distilled water to remove the polyethyleneglycol, which was not bonded to the silica layer, and then the wiped test plate was left to stand in atmosphere at room temperature for 24 hours. When the contact angle of water on the surface of the silica layer (to which the polyethyleneglycol layer bonded) of the resultant test specimen was measured, the value was 47 degrees. The pencil hardness of the surface of the silica layer was 2H or 3H. Physical states of the surface of the silica layer were observed by means of an atomic force surface roughness meter to find the formation of domain structures based on the polyethyleneglycol. The surface of the silica layer of the test specimen was intensively rubbed with Kim Wipe (registered trade mark of Kimberly Clark, made of unwoven fabric) ten or more times, but the surface silica layer was not peeled, and the hydrophilicity thereof did not decrease.

Working Example 4

The surface of a test plate made of glass was coated with a xylene solution of perhydropolysilazane comprising —(SiH$_2$—NH)— as the repeating unit (a product of Clariant Japan, product name: NP-110, containing an amine-type catalyst) in a concentration of 2% by weight, where the coated amount was an amount sufficient to form a perhydropolysilazane coating with a thickness of from 100 to 180 nm. The coated test plate was left to stand for air-drying. Immediately after removal of the xylene, a xylene solution of polyethyleneglycol (Mw: 100) in a concentration of 2% by weight was coated onto the perhydropolysilazane coating, and the resulting coated test plate was left to stand in atmosphere at room temperature for one hour followed by being put into an electrical chamber to heat it for 30 minutes in 150° C. air.

After cooling, distilled water was streamed over the surface of a silica layer of this test panel to wash down the polyethyleneglycol, which was not bonded to the silica layer. The surface of the silica layer of the washed test panel was wiped with paper impregnated with distilled water to remove the polyethyleneglycol, which was not bonded to the silica layer, and then the wiped test plate was left to stand in atmosphere at room temperature for 24 hours. When the contact angle of water on the surface of the silica layer (to which the polyethyleneglycol layer bonded) of the resultant test specimen was measured, the value was 47 degrees. The surface of the silica layer of the test specimen was intensively rubbed with Kim Wipe (registered trade mark of Kimberly Clark, made of unwoven fabric) ten or more times, but the surface silica layer was not peeled, and the hydrophilicity thereof did not decrease.

Working Example 5

Similar to Working Example 1, a glass plate (pencil hardness: 9H) was coated with the perhydropolysilazane solution, polyethyleneglycol (Mw: 600) itself was applied onto the perhydropolysilazane coating, and the coated glass plate was heated to form a silica layer on the surface of the glass plate in the same manner as in Working Example 1 except that the glass plate (pencil hardness: 9H) was employed in place of the test plate made of stainless steel (SUS 304), and the polyethyleneglycol itself was employed in place of the solution thereof. The pencil hardness of the surface of the silica layer (to which the polyethyleneglycol layer bonded) was 6H. For comparison purpose, a glass plate (pencil hardness: 9H) was coated with the perhydropolysilazane solution, and the coated glass plate was heated to form the silica layer in the same manner as Example 1. The pencil hardness of the surface of the silica layer (to which the polyethyleneglycol layer did not bond) was 8H.

Working Example 6

A test specimen was prepared in the same manner as in Working Example 1 except that polyethyleneglycol (Mw: 600) of which one terminal was ethoxylated or polyethyleneglycol (Mw: 600) of which both terminals were ethoxylated was employed besides the polyethyleneglycol (Mw: 600), and the polyethyleneglycol itself was applied onto the perhydropolysilazane coating. Each resulting test specimen was left to stand at room temperature for ten days. Contact angle of water on the surface of the silica layer (to which the polyethyleneglycol layer bonded) of the resultant test specimen was measured. The contact angle of water of the test specimen employing polyethyleneglycol (Mw: 600) was 4.6 degrees, that of the test specimen employing polyethyleneglycol (Mw: 600) of which one terminal was ethoxylated was 17.8 degrees, whereas that of the test specimen employing polyethyleneglycol (Mw: 600) of which both terminal were ethoxylated was 51.0 degrees (Comparative Example).

Comparative Example 1

The surface (contact angle with water: 79 degrees) of a test plate made of stainless steel [SUS304] was coated with a xylene solution of perhydropolysilazane (a product of Clariant Japan, product name: NP-110, containing an amine-type catalyst) in a concentration of 2% by weight, where the coated amount was an amount sufficient to form a perhydropolysilazane coating with a thickness of 100 to 180 nm. The coated test plate was left to stand for air-drying. When the contact angle of water on the surface of the resultant test specimen was measured, the value was 71 degrees.

Comparative Example 2

A test plate coated with the xylene solution of perhydropolysilazane in Comparative Example 1 and dried in air was put into an electrical chamber to heat it for 30 minutes in 150° C. air. When the contact angle of water on the surface of the resultant test specimen after cooling to room temperature was measured, the value was 54 degrees.

Comparative Example 3

In Working Example 1, the surface (contact angle with water: 79 degrees) of a test plate made of stainless steel [SUS304] was coated with a xylene solution of polyethyleneglycol (Mw: 600) in a concentration of 2% by weight. When contact angle of water on the surface of this test plate after cooling was measured, the value was 37 degree. Distilled water was streamed over the surface of this test plate. The surface of the washed test panel was wiped with paper impregnated with distilled water. When the contact angle of water on the surface of this test plate after cooling was measured, the value was 79 degrees.

Comparative Example 4

The polyethyleneglycol (Mw: 600) employed in Working Example 1 or the polyethyleneglycol (Mw: 200) employed in Working Example 2 was poured into xylene, and the xylene was stirred to dissolve the polyethyleneglycol (weight ratio of xylene to the polyethyleneglycol is 100:2). The clear upper portion of the resulting xylene solution was absorbed into a glass pipet, and about ten drops thereof was dropped while stirring to the xylene solution of NP-110 in a concentration of 2% by weight which was employed in Working Example 1 (the weight ratio of the xylene solution of NP-110 to the xylene solution of polyethyleneglycol is 100:20).

The stirring was discontinued when felt ammonia smells while dropping. After one minutes or five minutes, the surface (contact angle with water: 79 degrees) of a test plate made of stainless steel [SUS304] was coated with the xylene solution, and was (21) subjected to heating etc. in the same condition as in Working Example 1 to prepare a test specimen. The contact angle of water on the surface of this test specimen was measured immediately after preparation, after one day, after five days, and after water washing after five days. These results are shown in Table 1. When the surface of each test specimen was rubbed with Kim Wipe (registered trade mark of Kimberly Clark, made of unwoven fabric) three times, the surface layer was peeled away.

Comparative Example 5

A test specimen was prepared in the same manner as in Comparative Example 4 except that a glass plate was employed in place of the stainless steel (SUS304) plate, and the polyethyleneglycol (Mw: 600) was employed. The pencil hardness of the surface of a heated layer of a mixture of perhydropolysilazane and polyethyleneglycol (Mw: 600) was 4B.

[Test for Platelet Adhesion to Surface of Test Specimen]

Similar to Working Example 1, a test specimen having a silica layer on the surface of a test plate made of platinum and a polyethyleneglycol layer on the silica layer was prepared in the same manner as Working Example 1 except that a platinum plate was employed in place of the stainless steel (SUS304) and polyethyleneglycol (Mw: 600) itself was employed in place of the polyethyleneglycol (Mw: 600) solution. This test specimen and the platinum plate were subjected to the platelet adhesion test. Very few platelets and proteins adhered to the surface of the polyethyleneglycol layer, and the platelet rarely deformed, whereas many platelets and proteins adhered to the surface of the platinum plate itself, and the platelets adhering to the platinum plate deformed significantly.

[Test for Protein Adhesion to Surface of Test Specimen]

The glass plate employed in Working Example 5, a test specimen comprising a glass plate having the silica layer formed on the glass plate in the same manner as in Working Example 5, and the test specimen comprising the glass plate having the polyethyleneglycol layer on the silica layer formed on the glass plate according to Working Example 5 were subjected to the protein adsorbing test, and the results were shown in Table 2 to Table 4.

TABLE 2

| Adsorbed Amount of Proteins Contained in Albumin | | | | |
|---|---|---|---|---|
| | 1 | 2 | 3 | average |
| glass plate | 134.2 | 139.8 | 144.3 | 139.4 |
| glass plate/silica layer | 127.4 | 121.5 | 124.9 | 124.6 |
| glass plate/silica layer/PEG layer | 94.7 | 99.9 | 104.2 | 99.6 |

Note:
the values are fluorescent intensity.

TABLE 1

| | Time period (minute) | immediately after preparation | | | after 1 day | | | after 5 days | | | after water washing after 5 days | | |
|---|---|---|---|---|---|---|---|---|---|---|---|---|---|
| | | Max | Min | Average | Max | Min | Average | Max | Min | Average | Max | Min | Average |
| PZ + PEG200 | about 1 | 90.2 | 83.7 | 87.7 | 93.1 | 86.1 | 90.8 | 91.2 | 83.0 | 88.1 | 77.6 | 58.3 | 70.0 |
| PZ + PEG600 | about 1 | 80.6 | 73.4 | 77.1 | 82.4 | 65.1 | 75.1 | 79.2 | 62.7 | 73.3 | 68.2 | 67.2 | 67.6 |
| PZ + PEG600 | about 5 | 109.5 | 101.0 | 105.3 | 112.8 | 101.0 | 106.6 | 93.5 | 82.4 | 88.5 | 10.5 | 4.8 | 6.2 |

Note:
Time period means time period between stirring and coating.
PZ means NP-110.
PEG200 means polyethyleneglycol (Mw: 200).
PEG600 means polyethyleneglycol (Mw: 600).

TABLE 3

Adsorbed Amount of Proteins Contained in Fibrinogen

|  | 1 | 2 | 3 | average |
|---|---|---|---|---|
| glass plate | 110.2 | 112.4 | 121.9 | 114.8 |
| glass plate/silica layer | 102.9 | 107.4 | 105.8 | 105.3 |
| glass plate/silica layer/PEG layer | 42.4 | 39.4 | 43.6 | 41.8 |

Note:
the values are fluorescent intensity.

TABLE 4

Protein Adhesion Test

|  | Mole ratio of fibrinogen/albumin |
|---|---|
| glass plate | 0.824 |
| glass plate/silica layer | 0.846 |
| glass plate/silica layer/PEG layer | 0.420 |

Industrial Applicability

Since the inventive substrate with the modified surface has the surface having excellent hydrophilicity, durability thereof, abrasion resistance, and chemical resistance, it is suitable as a metal column, capillary, column packing, tube, and other components for analysis equipment; a glass ware for experiments, spatula made of stainless steel, petri dish for fungus incubation, and other instruments for physics and chemistry; a food ware, knife, folk, spoon, and other living wares; and a tile, pipe, sheet glass, screen door, and other resources for housing environment.

Since it has excellent compatibility with a human body, particularly biocompatibility, it is suitable as materials constituting components and articles which are utilized in contact with a human body, particularly biological constituents (for example, blood, lymph fluid). Since it does not cause symptoms such as metal allergy on a human body, and platelets and proteins hardly adhere to it, it is suitable as an injection needle, catheter, surgical knife, scissors, clip, artificial joint, artificial bone, screw, nut, plate, fixing device, wire, stent-graft, and other medical components, tools, or instruments; an implant, bracket, and other components for dental treatments; a pierced earring, earring, necklace, and other ornamental components; scissors for hair dressing and beautification.

The invention claimed is:

1. A method for modifying a surface of a substrate, the method comprising the steps of:
   (1) forming a polysilazane coating by applying a polysilazane onto a surface of the substrate;
   (2) applying an organic compound directly in liquid form at ambient temperatures, or applying a solution of the organic compound dissolved in an organic solvent without a hydroxyl group, onto a surface of the polysilazane coating, wherein the organic compound is a polyalkyleneglycol having a main backbone that comprises an organic group represented by the following formula [1]: —[RO]$_n$—, wherein R represents an alkylene group having 1 to 4 carbon atoms, and n represents a positive number of not less than 2, and wherein the polyalkyleneglycol further has hydroxyl groups at one or both molecular terminals; and
   (3) after performing steps (1) and (2) above, heating the substrate, thereby converting the polysilazane to silica so that the polysilazane coating forms a silica layer, and chemically bonding the organic compound to the silica of the silica layer.

2. The method for modifying the surface according to claim 1, wherein the substrate is an inorganic substrate.

3. The method for modifying the surface according to claim 2, wherein the inorganic substrate is a metal, glass or ceramic.

4. The method for modifying the surface according to claim 1, wherein the polysilazane has a unit represented by the formula:

as the repeating unit, and
wherein the polyalkyleneglycol is represented by the general formula:

$$HO[R^4O]_nH \qquad (2),$$

wherein $R^4$ represents an alkylene group having 1 to 4 carbon atoms, and n is a value of 2 or more, or the polyalkyleneglycol is unit represented by the general formula:

$$HO[R^5O]_nR^6 \qquad (3),$$

wherein $R^5$ represents an alkylene group having 1 to 4 carbon atoms, $R^6$ represents an alkyl having 1 to 3 carbon atoms, and n is a value of 1 or more.

5. The method for modifying the surface according to claim 4, wherein the polysilazane is perhydropolysilazane, and the polyalkyleneglycol represented by the formula (2) or the formula (3) is polyethyleneglycol.

6. The method for modifying the surface according to claim 1, wherein the polysilazane contains a catalytic amount of a catalyst for accelerating the conversion to silica.

7. The method for modifying the surface according to claim 5, wherein the number average molecular weight of polyethyleneglycol is from 90 to 2,000.

8. The method for modifying the surface according to claim 6, wherein the catalyst for accelerating the conversion to silica is an amine-based catalyst.

9. The method for modifying the surface according to claim 1, wherein the percentage in conversion from the polysilazane to silica is not less than 80%.

10. The method for modifying the surface according to claim 1, wherein the thickness of the silica layer is 10 to 1500 nm.

11. A substrate with a modified surface comprising:
    (a) a silica layer formed on a surface of a substrates; and
    (b) a layer of an organic compound, wherein the organic compound is a polyethyleneglycol having a main backbone that comprises an organic group represented by the following formula [1]: —[RO]$_n$—, wherein R represents an alkylene group, having 1 to 4 carbon atoms, and n represents a positive number of not less than 2, wherein the layer of the organic compound is formed on a surface of the silica layer, wherein the organic compound is chemically bonded to silica of the silica layer.

12. The substrate according to claim 11, wherein the thickness of the silica layer is 10 to 1500 nm.

13. The substrate according to claim 11, wherein the organic compound layer has a domain structure.

14. The substrate according to claim 11, wherein the substrate is an inorganic substrate.

15. The substrate according to claim 14, wherein the inorganic substrate is a metal, glass, or ceramics.

16. The substrate according to claim 11, wherein said silica layer is derived from the polysilazane.

17. The substrate according to claim 16, wherein the polysilazane comprises a repeating unit represented by the formula:

, and
wherein the polyalkyleneglycol is represented by the general formula:

wherein $R^4$ represents an alkylene group having 1 to 4 carbon atoms, n is a value of 2 or more, or the polyalkyleneglycol is represented by the general formula:

wherein $R^5$ represents an alkylene group having 1 to 4 carbon atoms, $R^6$ represents an alkyl group having 1 to 3 carbon atoms, and n is a value of 1 or more.

18. The substrate according to claim 17, wherein the polysilazane is perhydropolysilazane, and the polyalkyleneglycol represented by the formula (2) or the formula (3) is polyethyleneglycol.

19. The substrate according to claim 17, wherein the silica layer on the surface of the substrate has a hydrophilic surface.

20. The substrate according to claim 19, wherein the contact angle of a water droplet on the surface of the silica layer is 10 to 50 degrees.

21. The substrate according to claim 20, wherein the substrate with the modified surface is a material constituting a component or article which is used in contact with a human body.

22. A method for producing a substrate with a modified surface, the method comprising the steps of:
(1) forming a polysilazane coating by applying a polysilazane onto the surface of the substrate;
(2) applying an organic compound directly in liquid from at ambient temperatures, or applying a solution of the organic compound dissolved in an organic solvent without a hydroxyl group, onto a surface of the polysilazane coating, wherein the organic compound is a polyalkyleneglycol having a main backbone that comprises an organic group represented by the following formula [1]: —[RO]$_n$—, wherein R represents an alkylene group having 1 to 4 carbon atoms, and n represents a positive number of not less than 2, and wherein the alkyleneglycol or the polyalkyleneglycol further has hydroxyl groups at one or both molecular terminals;
(3) after performing steps (1) and (2) above, converting the polysilazane to silica so that the polysilazane coating forms a silica layer, and chemically bonding the organic compound to the silica of the silica layer; and
(4) thereby producing the substrate with a modified surface.

23. The method for producing a substrate according to claim 22, wherein the conversion of the polysilazane coating to the silica layer and the chemical bonding are accomplished by heating.

24. The method for producing a substrate according to claim 22, wherein the polysilazane has a unit represented by the formula:

as the repeating unit, and
wherein polyalkyleneglycol is represented by the general formula:

wherein $R^4$ represents an alkylene having 1 to 4 carbon atoms, n is a value of 2 or more, or the alkyleneglycol or polyalkyleneglycol is represented by the general formula:

wherein $R^5$ represents an alkylene group having 1 to 4 carbon atoms, $R^6$ represents an alkyl group having 1 to 3 carbon atoms, and n is a value of 2 or more.

25. The method for producing a substrate according to claim 24, wherein the polysilazane is perhydropolysilazane, and the polyalkyleneglycol represented by the formula (2) or the formula (3) is polyethyleneglycol.

26. The method for producing a substrate according to claim 22, wherein the polysilazane contains a catalytic amount of a catalyst for accelerating the conversion to silica.

27. The method for producing a substrate according to claim 26, wherein the catalyst for accelerating the conversion to silica is an amine-based catalyst.

28. The method for modifying the surface according to claim 1, wherein the organic compound is applied as a solution of the organic compound in the organic solvent without the hydroxyl group that does not dissolve or scarcely dissolves the polysilazane, and that does not decompose the polysilazane.

29. The method for producing a substance with a modified surface according to claim 22, wherein the organic compound is applied as a solution of the organic compound in the organic solvent without the hydroxyl group that does not dissolve or scarcely dissolves the polysilazane, and that does not decompose the polysilazane.

30. The method for producing a substrate with a modified surface according to claim 23, wherein the organic compound is applied as the solution of the organic compound in the organic solvent without the hydroxyl group that does not dissolve or scarcely dissolves the polysilazane, and that does not decompose the polysilazane.

31. A method for modifying a surface of a substrate, the method comprising the steps of:
(1) forming a polysilazane coating by applying a polysilazane onto a surface of the substrate;
(2) applying an organic compound directly in liquid form at ambient temperatures, or applying a solution of the organic compound dissolved in a solvent selected from the group consisting of dibutylether, tetrahydrofuran, xylene, toluene and benzene, onto a surface of the polysilazane coating, wherein the organic compound is an alkyleneglycol or a polyalkyleneglycol having a main backbone that comprises an organic group represented by the following formula [1]: —[(R)$_m$O]$_n$—, wherein R represents an alkylene group having 1 to 4 carbon atoms, and m and n respectively represent a positive number of not less than 1, and wherein the alkyleneglycol or the polyalkyleneglycol further has hydroxyl groups at one or both molecular terminals; and (3) after performing steps (1) and (2) above, heating the substrate, thereby converting the polysilazane to silica so that the polysilazane coating forms a silica layer, and chemically bonding the organic compound to the silica of the silica layer.

32. A method for producing a substrate with a modified surface, the method comprising the steps of:

(1) forming a polysilazane coating by applying a polysilazane onto a surface of the substrate;

(2) applying an organic compound directly in liquid form at ambient temperatures, or applying a solution of the organic compound dissolved in a solvent selected from the group consisting of dibutylether, tetrahydrofuran, xylene, toluene and benzene, onto a surface of the polysilazane coating, wherein the organic compound is an alkyleneglycol or a polyalkyleneglycol having a main backbone that comprises an organic group represented by the following formula [1]: $-[)_m O]_n-$, wherein R represents an alkylene group having 1 to 4 carbon atoms, and m and n respectively represent a positive number of not less than 1, and wherein the alkyleneglycol or the polyalkyleneglycol further has hydroxyl groups at one or both molecular terminals;

(3) after performing steps (1) and (2) above. converting the polysilazane to silica so that the polysilazane coating forms a silica layer, and chemically bonding the organic compound to the silica of the silica layer; and (4) thereby producing the substrate with a modified surface.

* * * * *